(12) United States Patent
Yamana

(10) Patent No.: US 7,903,328 B2
(45) Date of Patent: Mar. 8, 2011

(54) MICROSCOPE SYSTEM HAVING VIBRATION DAMPENING MECHANISM

(75) Inventor: Motokazu Yamana, Tokyo (JP)

(73) Assignee: Olympus Corporation, Tokyo (JP)

( * ) Notice: Subject to any disclaimer, the term of this patent is extended or adjusted under 35 U.S.C. 154(b) by 142 days.

(21) Appl. No.: 12/325,372

(22) Filed: Dec. 1, 2008

(65) Prior Publication Data

US 2009/0147356 A1  Jun. 11, 2009

(30) Foreign Application Priority Data

Dec. 6, 2007  (JP) .................................. 2007-316184

(51) Int. Cl.
*G02B 21/00* (2006.01)
(52) U.S. Cl. ........................................................ 359/368
(58) Field of Classification Search .................. 359/368, 359/392
See application file for complete search history.

(56) References Cited

U.S. PATENT DOCUMENTS

| | | | | |
|---|---|---|---|---|
| 5,286,013 | A * | 2/1994 | Seymour et al. | 267/220 |
| 6,259,671 | B1 * | 7/2001 | Shibusaka | 720/681 |
| 6,330,120 | B1 * | 12/2001 | Shibusaka et al. | 359/814 |
| 6,567,212 | B1 | 5/2003 | Engelhardt et al. | |
| 7,468,851 | B2 * | 12/2008 | Uno et al. | 359/824 |
| 2001/0024320 | A1 | 9/2001 | Okada | |
| 2008/0278828 | A1 | 11/2008 | Rau et al. | |
| 2009/0122284 | A1 * | 5/2009 | Butler et al. | 355/53 |

FOREIGN PATENT DOCUMENTS

| | | |
|---|---|---|
| DE | 2 163798 A1 | 7/1973 |
| DE | 29 33 726 A1 | 3/1981 |
| EP | 1 186 931 A2 | 3/2002 |
| JP | 3-250165 A | 11/1991 |
| JP | 2001-221733 A | 8/2001 |
| WO | WO 2007/006577 A1 | 1/2007 |

OTHER PUBLICATIONS

Extended European Search Report dated Mar. 23, 2009 (5 pages), issued in counterpart European Application Serial No. 08020974.5.

* cited by examiner

*Primary Examiner* — Mark Consilvio
(74) *Attorney, Agent, or Firm* — Holtz, Holtz, Goodman & Chick, PC

(57) ABSTRACT

A movable part to which a specimen or optical component is fixed is effectively damped in a short period of time at low cost, while saving space and energy and avoiding heat generation, thus allowing high-precision observation of a specimen to be carried out quickly after stopping at a certain position. The invention provides a microscope system including a driving mechanism for driving a movable part to which a specimen or optical component is fixed and stopping the movable part at a certain position; and a vibration damping mechanism for damping vibrations generated when stopping the movable part with the driving mechanism. The vibration damping mechanism includes an inertial member having a prescribed mass and a viscoelastic member sandwiched between the inertial member and the movable part. Dimensions in a plurality of directions of the viscoelastic member are set on the basis of resonance frequencies of vibrations generated in multiple directions when stopping the movable part.

7 Claims, 6 Drawing Sheets

MICROSCOPE SYSTEM HAVING VIBRATION DAMPENING MECHANISM

BACKGROUND OF THE INVENTION

1. Field of the Invention

The present invention relates to microscope systems.

This application is based on Japanese Patent Application No. 2007-316184, the content of which is incorporated herein by reference.

2. Description of Related Art

In order to perform driving of an objective lens or other part with high precision, a known laser scanning microscope in the related art is equipped with a vibration damping mechanism including a weight and a viscoelastic member (see Japanese Unexamined Patent Application, Publication No. 2001-221733).

In the vibration damping mechanism disclosed in Japanese Unexamined Patent Application, Publication No. 2001-221733, by sandwiching a viscoelastic member between a fixed portion fixed to an objective lens and a weight provided on the fixed portion so as to be capable of moving only in the optical-axis direction, which is the moving direction of the objective lens, via a hinge, the viscoelastic member is made to expand and contract in response to vibrations, thus damping the vibrations of the objective lens.

However, although the vibration damping mechanism disclosed in Japanese Unexamined Patent Application, Publication No. 2001-221733 can stabilize and dampen vibrations associated with movement and stopping in the optical-axis direction of the objective lens, the vibrations associated with movement and stopping of the objective lens are not limited only to those in the optical-axis direction; therefore, it is necessary to provide separate countermeasures for the vibrations in other directions.

In addition, a microscope system includes multiple optical components that need to be moved for high-speed positioning, not just the objective lens, and it is necessary to dampen vibrations in a plurality of directions effectively and quickly also in these optical components.

BRIEF SUMMARY OF THE INVENTION

The present invention provides a microscope system that can effectively and quickly dampen a movable part, to which a specimen or optical component is fixed, at low cost while saving space and energy and avoiding heat generation, thus enabling high-precision observation of the specimen quickly after a high-speed positioning movement.

A microscope system according to a first aspect of the present invention includes a driving mechanism configured to drive a movable part to which a specimen or optical component is fixed and to stop the movable part at a certain position; and a vibration damping mechanism configured to dampen vibrations generated when stopping the movable part with the driving mechanism; wherein the vibration damping mechanism includes an inertial member having a prescribed mass and a viscoelastic member sandwiched between the inertial member and the movable part, and wherein dimensions in a plurality of directions of the viscoelastic member are set on the basis of resonance frequencies of vibrations generated in multiple directions when stopping the movable part.

With the aspect described above, the specimen or optical component fixed to the movable part can be stopped at a certain position by operating the driving mechanism to drive the movable part and stop it at a certain position. Although the movable part vibrates according to the force of inertia, which depends on its mass and the mass of the specimen or optical component fixed thereto, and the rigidity of the driving mechanism, those vibrations are damped by the vibration damping mechanism.

In this case, even if the movable part vibrates not only in the moving direction of the driving mechanism but also in another direction, the inertial member fixed to the viscoelastic member is displaced in all vibration directions. Then, because the viscoelastic member is expanded and contracted by this displacement, damping movement is performed for all of these vibrations. Because the dimensions of the viscoelastic member are set on the basis of the resonance frequencies of the vibrations in each direction, it is possible to effectively dampen the vibrations in all directions. Accordingly, it is possible to quickly suppress image blurring and vibrations of the specimen, allowing rapid, high-precision observation to be carried out at low cost. Because vibrations in a plurality of directions are effectively damped by the vibration damping mechanism formed of a single inertial member and viscoelastic member, the space required for installation can be minimized, which allows a compact microscope system to be provided. In addition, because the viscoelastic member is used, it is possible to perform damping without the need for a separate energy source, and heat generation can be suppressed, which prevents problems such as deformation of parts.

The aspect described above may further include a base member, wherein the driving mechanism drives the movable part relative to the base member, and wherein another vibration damping mechanism is provided in the base member.

With this configuration, when stopping the movable part at a certain position with the driving mechanism, although vibrations are generated also in the base member due to a reaction force, the vibrations of the base member are also quickly damped by the other vibration damping mechanism provided in the base member. Therefore, it is possible to perform high-precision observation even more quickly after stopping positioning.

In the aspect described above, the movable part may be a stage on which the specimen is mounted; and the vibration damping mechanism may be disposed at substantially the center of a bottom face of the stage and may dampen vibrations in a moving direction of the stage and vibrations in a direction in which the stage is made to curve.

With this configuration, vibrations in the moving direction of the stage and vibrations in a direction in which the stage is made to curve, which occur when the driving mechanism is operated to move the specimen and stop it at a certain position, can be simultaneously damped with the vibration damping mechanism, thus quickly suppressing vibrations of the specimen and allowing high-precision observation to be carried out quickly after movement stopping.

In the aspect described above, the movable part may be a circular-plate-shaped filter turret in which are mounted a plurality of filters that modulate light, and the vibration damping mechanism may be disposed on an outer circumferential surface of the filter turret and may dampen vibrations in a rotational direction of the filter turret and vibrations in a thickness direction of the filter turret.

With this configuration, vibrations in the rotating direction and the thickness direction of the filter turret, which occur when the filter turret is rotated to change the filter for modulating the light and stopped at a certain position, can be quickly damped at the same time, which prevents the intrusion of optical noise in the image due to movement of the transmission position of the light through the filter and allows high-precision observation to be carried out quickly after stopping at a certain position. The vibrations can be effectively damped by providing the vibration damping mechanism on the outer circumferential surface of the filter turret where the vibrations are largest.

In the aspect described above, the movable part may be a slider supporting a lens, a prism, or a mirror so as to be capable of moving in a straight line, and the vibration damping mechanism may be disposed on a side face of the slider and may dampen vibrations in a moving direction of the slider and vibrations in a direction orthogonal to the moving direction of the slider.

With this configuration, vibrations in the moving direction of the slider and vibrations in a direction orthogonal thereto, which occur when the lens, prism, mirror or the like is moved in a straight line and stopped at a certain position by moving the slider in a straight line, can be quickly and simultaneously damped, which prevents movement of the optical path and movement of the focal position and allows high-precision observation to be carried out quickly after stopping at a certain position.

In the aspect described above, the movable part may be a slider supporting an objective lens so as to be capable of moving in a straight line in an optical-axis direction, and the vibration damping mechanism may dampen vibrations in a moving direction of the slider and vibrations in a direction orthogonal to the moving direction of the slider.

With this configuration, vibrations in the moving direction of the objective lens and vibrations in a direction orthogonal thereto, which occur when the objective lens is moved in a straight line in the optical-axis direction and stopped at a certain position by moving the slider in a straight line, can be quickly and simultaneously damped, which prevents movement of the optical path and movement of the focal position and allows high-precision observation to be carried out quickly after stopping at a certain position. In addition, when the tip of the objective lens is disposed close to the specimen, with immersion oil or the like therebetween, vibration of the specimen due to vibration of the objective lens can be damped, thus preventing shaking of the specimen and maintaining its integrity.

In the aspect described above, the inertial member may be configured so that a center of mass thereof can be moved relative to the viscoelastic member.

With this configuration, when the weight changes as a result of the objective lens being changed, thus changing the resonance frequency, it is possible to adjust the resonance frequency by adjusting the center of mass of the inertial member. Thus, even if the objective lens is changed, it is possible to quickly and effectively suppress the vibrations, which allows high-precision observation to be carried out quickly after stopping at a certain position.

The present invention affords an advantage in that it can quickly and effectively dampen a movable part, to which a specimen or optical component is fixed, at low cost while saving space and energy and avoiding heat generation, thus allowing high-precision observation of the specimen to be carried out quickly after stopping at a certain position.

DETAILED DESCRIPTION OF THE INVENTION

A microscope system 1 according to an embodiment of the present invention will be described below with reference to FIGS. 1 to 7.

Figure 1:
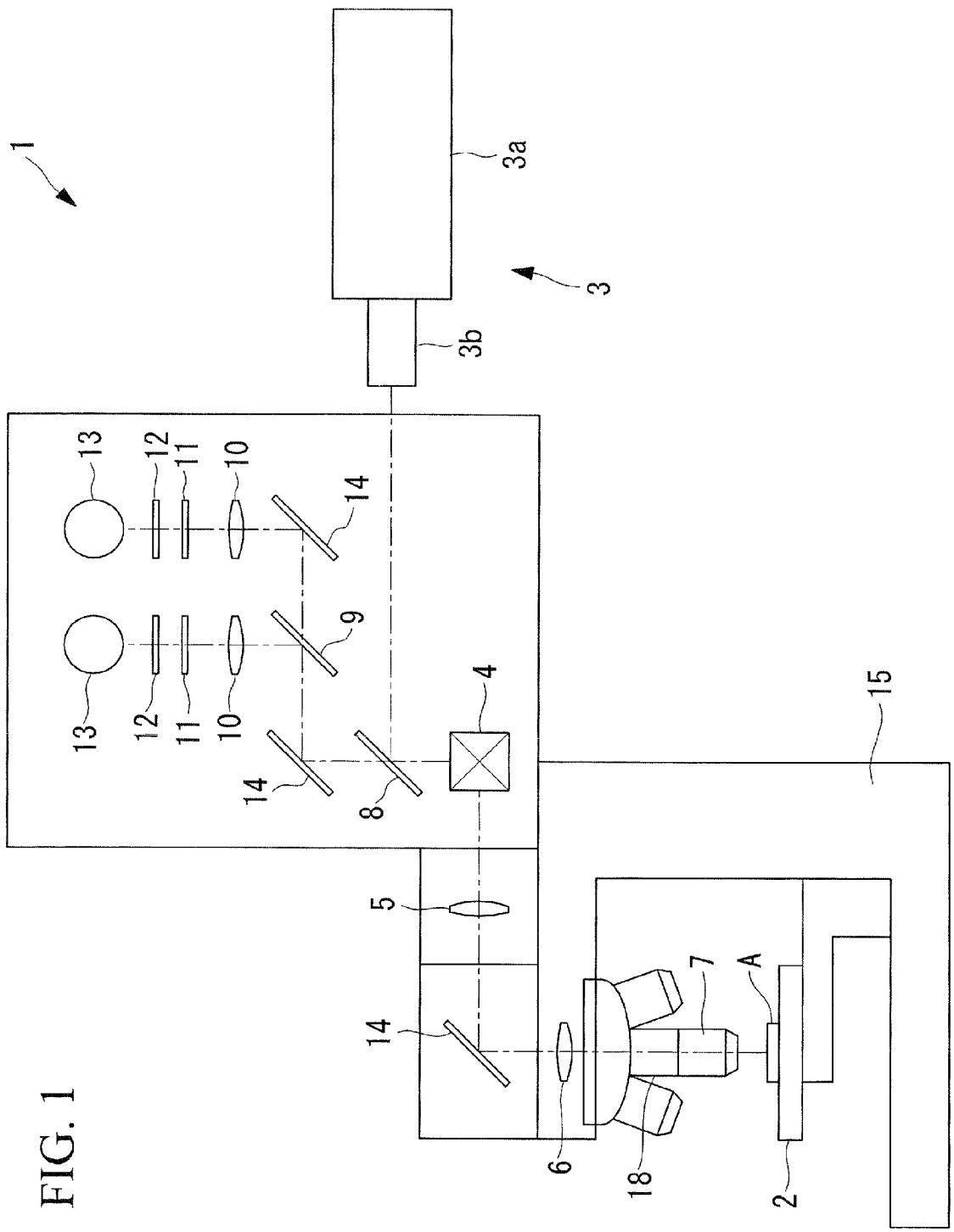
FIG. 1 is a diagram showing the overall configuration of a microscope system according to a first embodiment of the present invention.

As shown in FIG. 1, the microscope system 1 according to this embodiment includes a stage 2 for mounting a specimen A; a light source 3 that emits excitation light; a scanner 4 that two-dimensionally scans the excitation light from the light source 3; a pupil projection lens 5 and an image-forming lens 6 that focus the excitation light scanned by the scanner 4; an objective lens 7 that irradiates the specimen A with the excitation light and collects fluorescence generated in the specimen A; a dichroic mirror 8 that splits off from the excitation light the fluorescence which is collected by the objective lens 7 and which returns via the image-forming lens 6, the pupil-projection lens 5, and the scanner 4; a beam splitter 9 that divides the split-off fluorescence into each wavelength; and light detectors 13 that detect the divided fluorescence via focusing lenses 10, confocal pinholes 11, and barrier filters 12. Reference numeral 14 in the drawing is a mirror.

The light source 3 is equipped with an excitation light source 3a, for example, an argon laser light source, and an acousto-optic device such as an acousto-optic tunable filter (AOTF) 3b that intensity-modulates the excitation light emitted from the excitation light source 3a.

The stage 2 can be moved in two directions horizontally relative to a base 15, is driven by double linear motion mechanisms (driving mechanisms) 16 provided between the stage 2 and the base 15, and is stopped at a certain position where a prescribed observation site on the specimen A mounted on the stage 2 is aligned with the optical axis of the objective lens 7. Each of the linear motion mechanisms 16 is formed of, for example, a linear guide 16a, a motor 16b, and a ball screw 16c.

Figure 2:
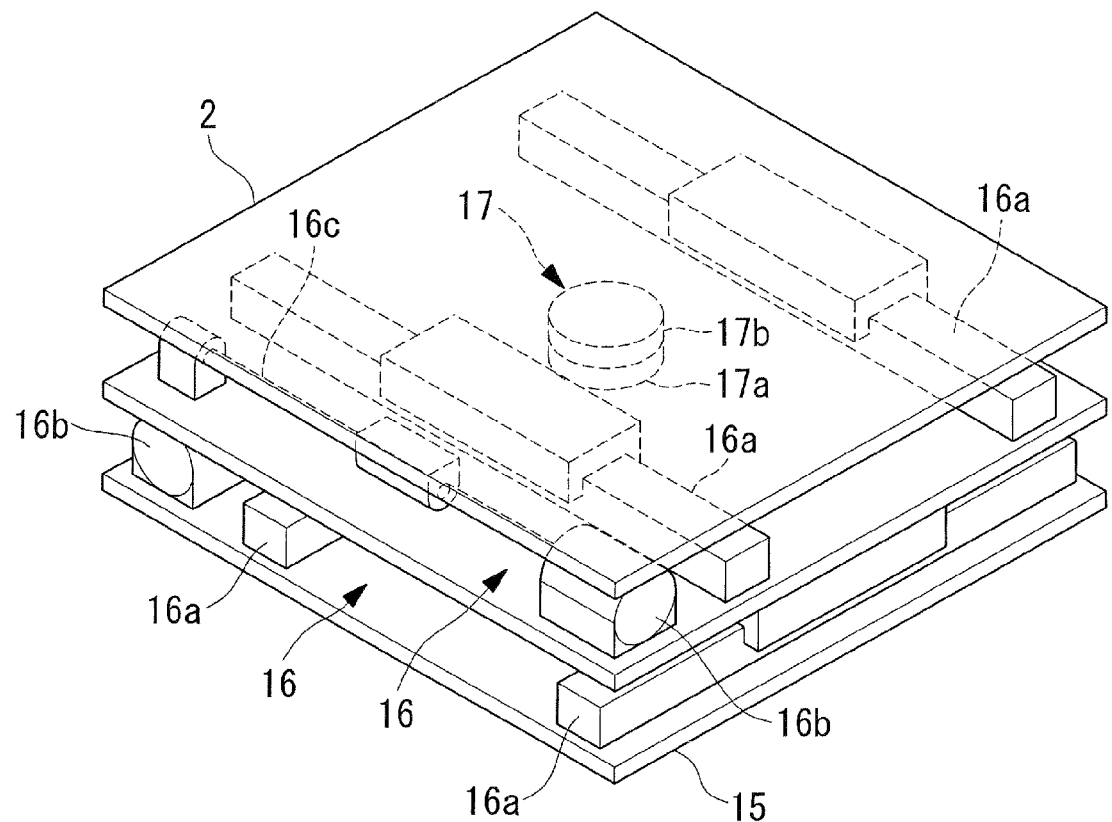
FIG. 2 is a perspective view showing a stage provided in the microscope system in FIG. 1.
Figure 3:
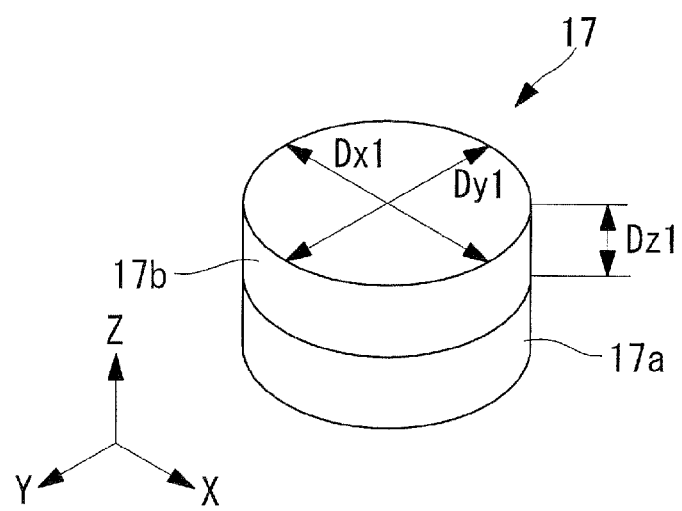
FIG. 3 is a perspective view showing a vibration damping mechanism provided in the stage in FIG. 2.

The stage 2 is provided with a vibration damping mechanism 17, as shown in FIGS. 2 and 3.

The vibration damping mechanism 17 provided in the stage 2 is formed of a weight (inertial member) 17a disposed at substantially the central position of the rear surface of the stage 2 and a viscoelastic member 17b disposed between the stage 2 and the weight, 17a.

The hardness of the viscoelastic member 17b and its dimensions Dx1, Dy1, and Dz1 are set on the basis of the resonance frequencies of vibrations in the X, Y, and Z directions, generated in the stage 2 when the stage 2 is driven and stopped by operating the linear motion mechanisms. In other words, the dimensions Dx1 and Dy1 are set so as to be aligned in the moving directions of the respective linear motion mechanisms 16 and so that the vibrations in the X and Y directions, generated due to acceleration during stopping, are reduced. The dimension Dz1 is set so that, when the stage 2 is driven by either linear motion mechanism 16 and then stopped, the vibrations in the Z direction of the stage 2, caused by insufficient rigidity of the stage 2 or the linear motion mechanisms 16, are reduced.

Figure 4:
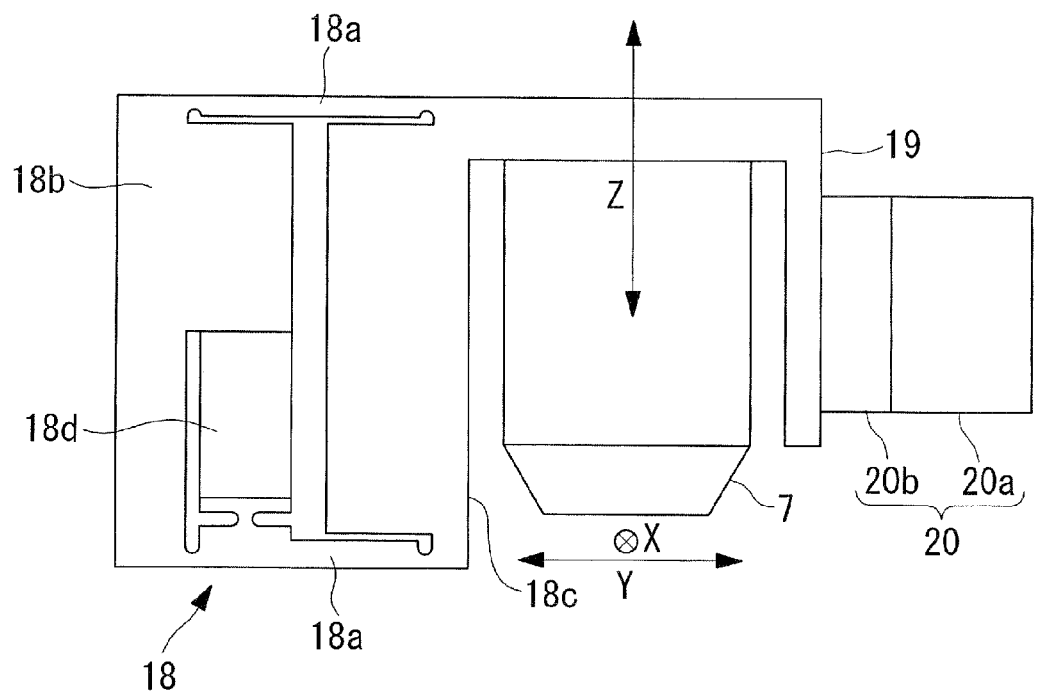
FIG. 4 is a side view showing an objective lens and a driving mechanism therefor, provided in the microscope system in FIG. 1.
Figure 5:
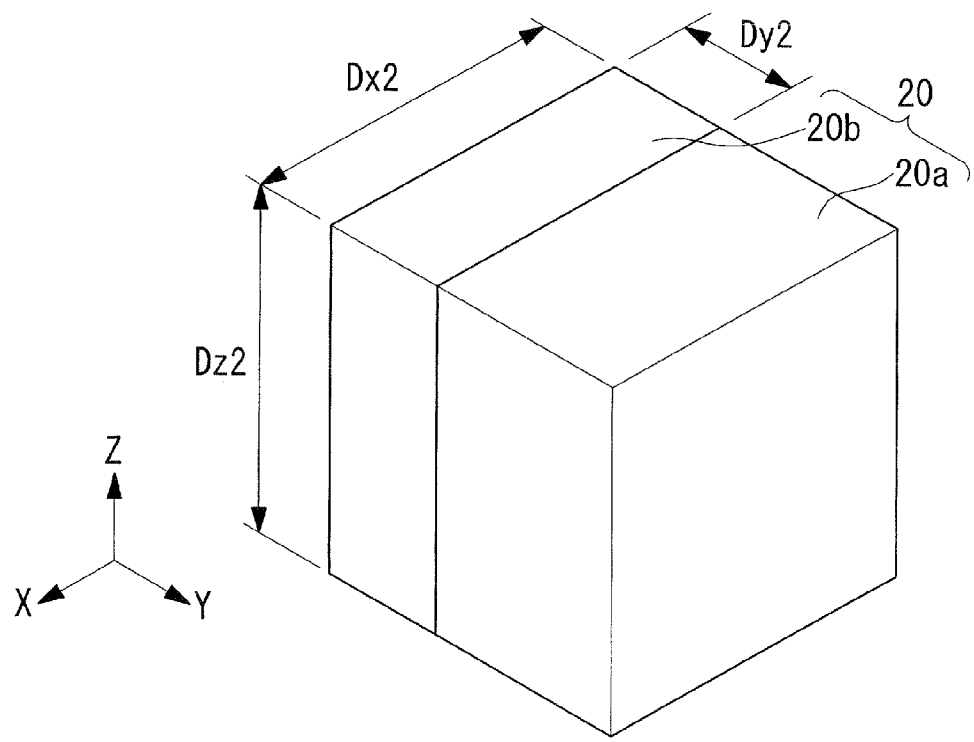
FIG. 5 is a perspective view showing a vibration damping mechanism provided in the objective lens in FIG. 4.

As shown in FIGS. 4 and 5, the objective lens 7 is driven in a direction parallel to the optical axis (Z direction) by a linear motion mechanism 18. Accordingly, the objective lens 7 is driven in the optical axis direction to adjust the focal position and is then driven at two or more prescribed focal positions and stopped at a certain position. The linear motion mechanism 18 is formed, for example, of a slider 18c joined to a base 18b by hinges 18a at two positions, and a piezoelectric actuator 18d disposed between the base 18b and the hinges 18a. When the linear motion mechanism 18 moves the objective lens 7, which is fixed to the slider 18c, by a minute distance, it can be moved in a substantially straight line.

The objective lens 7 is provided with a vibration damping mechanism 20 which is formed of a weight 20a disposed on a mounting base 19 which projects towards the opposite side of the objective lens 7 from the slider 18c, and a viscoelastic member 20b sandwiched between the weight 20a and the mounting base 19.

The hardness of the viscoelastic member 20b and its dimensions Dx2, Dy2, and Dz2 are set on the basis of the resonance frequencies of vibrations generated in the X, Y, and Z directions in the objective lens 7 when the objective lens 7 is driven and stopped by operating the linear motion mechanism 18.

In other words, the dimension Dz2 is set so as to be aligned with the direction in which the objective lens 7 is moved by the linear motion mechanism 18, so that vibrations in the Z direction, generated due to acceleration when it stops, are reduced. The dimensions Dx2 and Dy2 are set so that, when the objective lens 7 is driven by the linear motion mechanism 18 and stops, vibrations occurring while the objective lens 7 shifts in the X and Y directions as shown by the arrows in FIG. 4, caused by asymmetry of the base 18b, the slider 18c, etch, are reduced.

Figure 6:
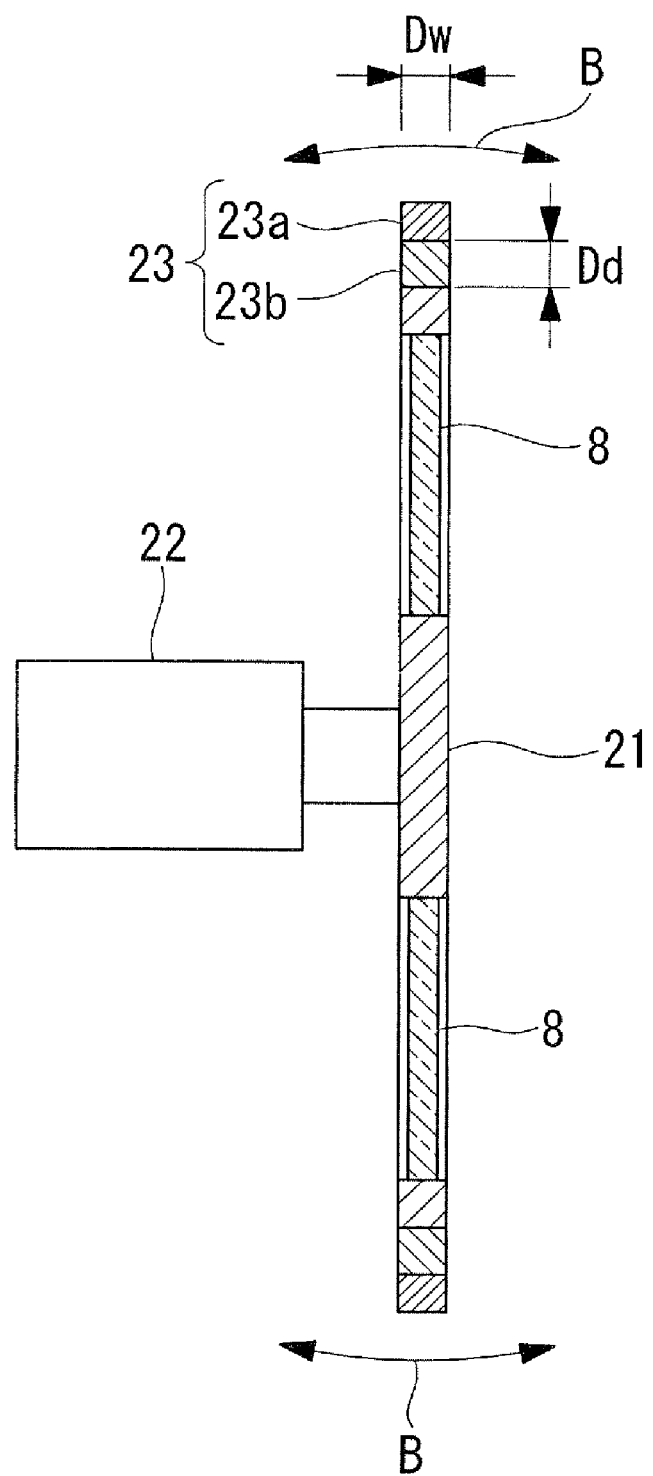
FIG. 6 is a longitudinal sectional view showing dichroic mirrors and a driving mechanism therefor, provided in the microscope system in FIG. 1.
Figure 7:
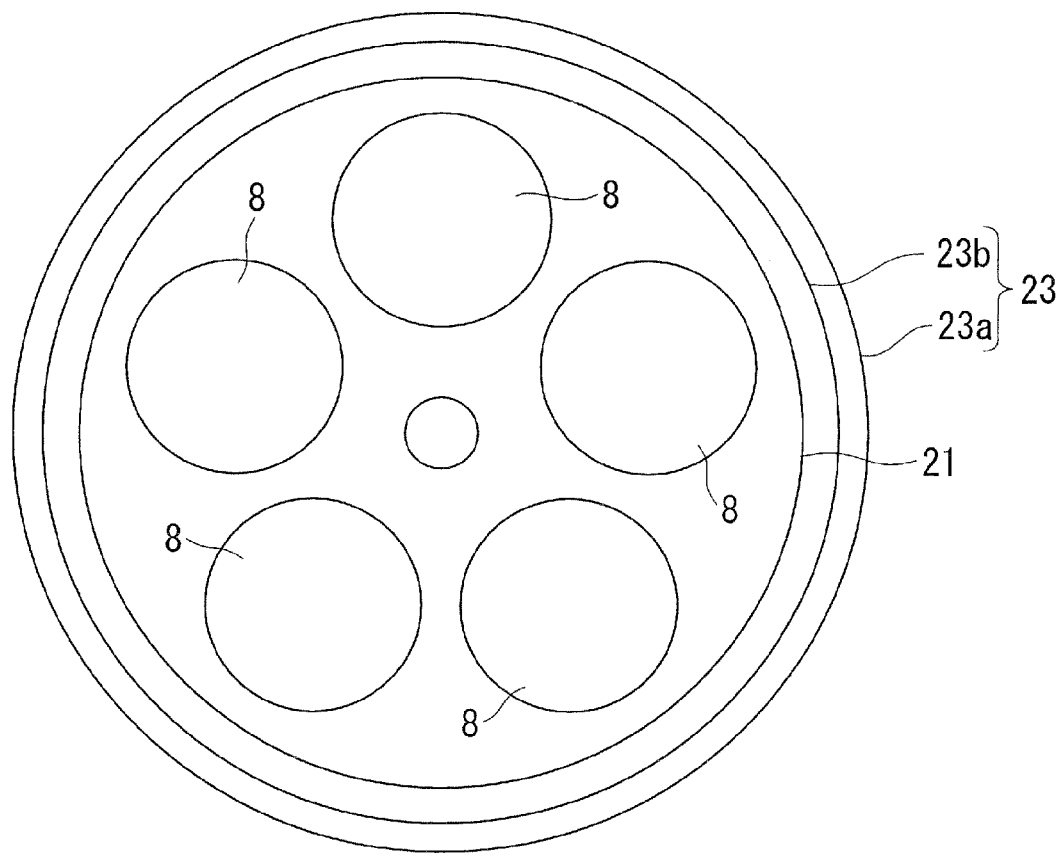
FIG. 7 is a front elevational view of the dichroic mirrors in FIG. 6.

As shown in FIGS. 6 and 7, a plurality of the dichroic mirrors 8 having different spectral characteristics are arranged with gaps therebetween in the circumferential direction of a circular plate-shaped turret 21. The turret 21 is supported so as to be capable of rotating about the center thereof by a rotational driving mechanism (for example, a motor) 22. The turret 21 is rotated by operating the rotational driving mechanism 22 and is stopped at a certain position where a dichroic mirror 8 having desired spectral characteristics is aligned with the optical axis.

A ring-shaped weight 23a is disposed in the turret 21, around the outer circumferential edge thereof, a ring-shaped viscoelastic member 23b is disposed at a position between the weight 23a and the outer circumferential surface of the turret 21, and a vibration damping mechanism 23 is formed by the viscoelastic member 23b and the weight 23a.

The hardness of the viscoelastic member 23b and its dimensions Dd and Dw are set on the basis of resonance frequencies of vibrations in the circumferential direction and the thickness direction, which are generated in the turret 21 when the turret 21 is driven and stopped by operating the rotational driving mechanism 22. In other words, the dimension Dd is set so that vibrations generated in the circumferential direction due to acceleration of the turret 21 by the rotational driving mechanism 22 when it stops are reduced.

The dimension Dw is set so that, when the turret 21 is driven by the rotational driving mechanism 22 and stops, vibrations occurring while the turret 21 shifts in the thickness direction, as shown by arrow B in FIG. 6, caused by asymmetric weight distribution of the turret 21 etc., are reduced.

Multiple beam splitters 9 and barrier filters 12 having different transmission wavelength bands are mounted in sliders which are moved in a straight line by linear motion mechanisms (not shown in the drawing). By moving the slider in a straight line by operating the linear motion mechanism, it is possible to selectively stop a beam splitter 9 or a barrier filter 12 having a desired wavelength band at a certain position on the optical axis.

In this case too, because the slider generates vibrations due to asymmetry not only in the moving direction thereof, but also in a direction intersecting the moving direction, for a vibration damping mechanism (not shown in the drawing) formed of a weight and an viscoelastic member, the dimensions of each part of the viscoelastic member are set on the basis of the resonance frequencies of vibrations in the moving direction and the direction intersecting it.

The operation of the thus-configured microscope system 1 according to this embodiment will be described below.

To perform fluoroscopy of the specimen A using the microscope system 1 according to this embodiment, excitation light is emitted from the excitation light source 3a, and the excitation light, two-dimensionally scanned by the scanner 4, is radiated onto the specimen A. Accordingly, fluorescence generated at the position where the excitation light is focused on the specimen A returns via the objective lens 7, the image-forming lens 6, the pupil-projection lens 5, and the scanner 4, is split-off from the excitation light by the dichroic mirror 8, is divided into each wavelength by the beam splitter 9, and is detected by the light detectors 13 via the focusing lenses 10, the confocal pinholes 11, and the barrier filters 12. By storing the scanning position of the excitation light by the scanner 4 and the intensity of the fluorescence detected by the light detectors 13 in association with each other, it is possible to obtain a two-dimensional fluorescence image.

In this case, to change the irradiation position of the excitation light on the specimen A, the stage 2 on which the specimen A is mounted is moved horizontally in two directions by operating the linear motion mechanisms 16 and is stopped at a certain position when the optical axis of the objective lens 7 is aligned with the desired irradiation position. When performing this motion at high speed, vibrations are generated in the stage 2 due to the large acceleration and/or the large deceleration acting on the stage 2.

In the microscope system 1 according to this embodiment, the weight 17a of the vibration damping mechanism 17 provided in the stage 2 moves together with the stage 2, and vibrations are absorbed by deformation of the viscoelastic member 17b due to the acceleration and/or the deceleration produced at that time. In particular, because the dimensions of the viscoelastic member 17b are set on the basis of the resonance frequencies of vibrations in the X and Y directions, it is possible to quickly dampen vibrations generated in multiple directions in the stage 2. It is also possible, in the same way, to dampen vibrations in the vertical direction in the stage 2 associated with the increase and decrease in speed of the stage 2.

Accordingly, vibrations of the specimen A are rapidly suppressed, making it possible to perform high-precision observation quickly after stopping at a certain position.

To change the focal position of the excitation light on the specimen A, the objective lens 7 is moved in the optical-axis direction by operating the linear motion mechanism 18 and is stopped at a certain position when it is aligned at a desired focal position. When this motion is performed at high speed, vibrations are generated in the objective lens 7 due to a large acceleration and/or a large deceleration acting on the objective lens 7.

In the microscope system 1 according to this embodiment, the weight 20a of the vibration damping mechanism 20 fixed to the slider 18c of the linear motion mechanism 18 which drives the objective lens 7 moves together with the slider 18c, and vibrations are absorbed by deformation of the viscoelastic member 20b due to the acceleration and/or the deceleration produced at that time. In particular, because the dimensions of the viscoelastic member 20b are set on the basis of the resonance frequencies of the vibrations in the X and Y directions, not just in the optical axis direction, it is possible to quickly dampen vibrations generated in multiple directions in the objective lens 7. Accordingly, vibrations in the objective lens 7 are suppressed in a short period of time, making it possible to perform high-precision observation quickly after stopping at a certain position.

To change the wavelength of the excitation light radiated onto the specimen A, the turret 21 is rotated by operating the rotational driving mechanism 22, and the turret 21 is stopped at a certain position where the dichroic mirror 8 that selectively transmits excitation light of a desired wavelength is aligned with the optical axis. When this motion is performed at high speed, vibrations are generated in the turret 21 due to a large acceleration and/or a large deceleration acting on the turret 21.

In the microscope system 1 according to this embodiment, when the turret 21 is rotationally driven, the weight 23a in the vibration damping mechanism 23 fixed to the turret 21 moves together with the turret 21, and vibrations are absorbed by deformation of the viscoelastic member 23b due to the acceleration and/or the deceleration produced at that time. In particular, because the dimensions of the viscoelastic member 23b are set on the basis of the resonance frequencies of vibrations not only in the rotational direction of the turret 21, but also in the thickness direction thereof, it is possible to rapidly dampen vibrations generated in multiple directions in the turret 21. Accordingly, the dichroic mirror 8 can be prevented from vibrating relative to the light beam from the light source 3, thus preventing vibration of the beam of excitation light irradiating the specimen A, which makes it possible to perform high-precision observation quickly after stopping at a certain position.

To change the wavelength of the fluorescence to be detected or the wavelength of the excitation light to be blocked, the slider in which the beam splitters 9 or the barrier filters 12 are fixed is moved by operating the linear motion mechanism, and the slider is stopped at a certain position where the beam splitter 9 or the barrier filter 12 having the desired spectral characteristics is aligned with the optical axis of the fluorescence. When this motion is performed at high speed, vibrations are generated in the slider due to a high acceleration and/or a high deceleration acting on the slider.

In this embodiment, because the slider is provided with the vibration damping mechanism, the weight moves due to the acceleration and/or the deceleration produced during movement of the slider, and the vibrations are damped by deformation of the viscoelastic member at that time. Accordingly, it is possible to prevent vibration of the beam of fluorescence passing through the beam splitter 9 or the barrier filter 12, which makes it possible to perform high-precision observation quickly after stopping at a certain position.

In these cases, vibrations in multiple directions in the movable parts are effectively suppressed with the vibration damping mechanisms 17, 20, and 23 which are formed of a single weight 17a, 20a, and 23a and a viscoelastic member 17b, 20b, and 23b provided in the stage 2, the turret 21, and the slider 18c constituting each movable part; therefore, it is possible to minimize the installation space required, thus providing a compact microscope system 1. Because the viscoelastic members 17b, 20b, and 23b are used, it is possible to perform damping without the need for a separate energy source, thus reducing heat generation and preventing the occurrence of problems such as deformation of parts.

Figure 8A:
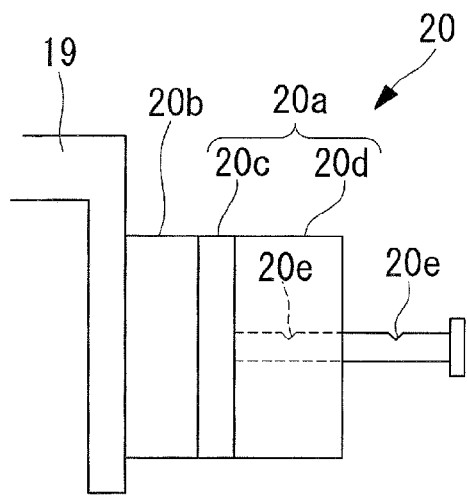
FIG. 8A is a side view showing a modification of the vibration damping mechanism in FIG. 5.
Figure 8B:
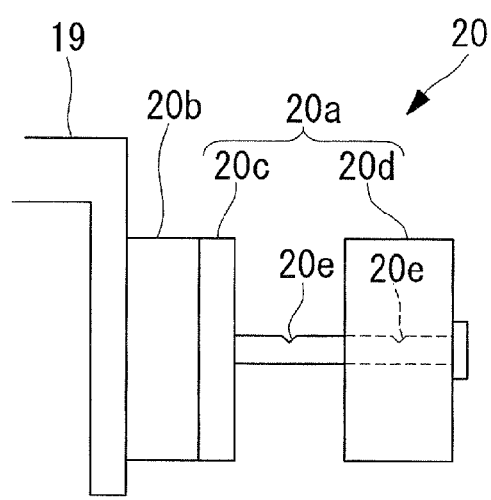
FIG. 8B is a side view showing a modification of the vibration damping mechanism in FIG. 5.

This embodiment has been described in terms of a case where damping is performed for a single objective lens 7. Instead of this, however, as shown in FIGS. 8A and 8B, a first weight portion 20c bonded to the viscoelastic member 20b and a second weight portion 20d attached so as to be capable of moving relative to the first weight portion 20c may be provided as a weight, and by moving the second weight portion 20d relative to the first weight portion 20c, the center of mass of the weight 20a is changed, thus changing the damping frequency, which allows a plurality of objective lenses 7 with different masses to be damped. Reference numerals 20e in the drawing are locking grooves for fixing the second weight portion 20d in each position.

Figure 9:
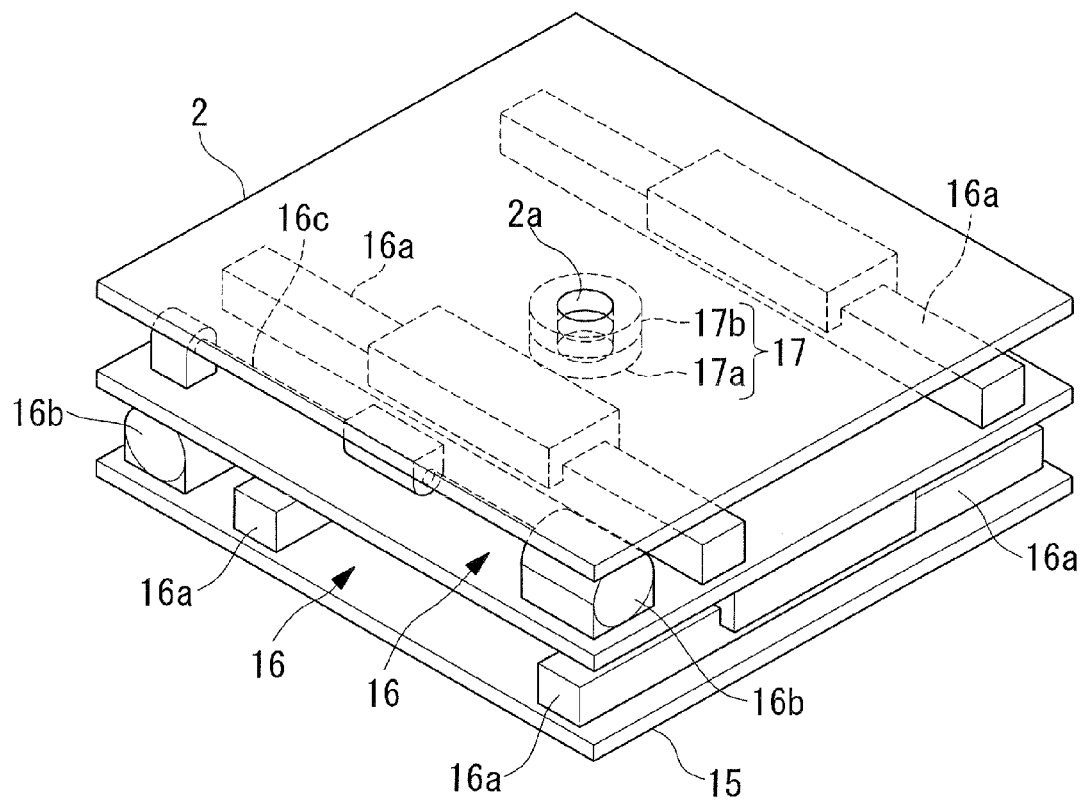
FIG. 9 is a perspective view showing a modification of the stage in FIG. 2.

In the case of transmitted-light observation, damping may be performed with a ring-shaped weight 17a and viscoelastic member 17b, like those shown in FIG. 9, functioning as the vibration damping mechanism 17 provided in the stage 2, so as not to block a through-hole 2a provided at the center of the stage 2.

When the vibrations to be damped have a plurality of frequencies, a plurality of vibration damping mechanisms formed of weights and viscoelastic members that are tuned based on different resonance frequencies may provided.

As a result of performing damping of the stage 2, the objective lens 7, the turret 21, or the slider relative to the base 15, when vibrations are generated at the base 15 due to a reaction force, the same type of vibration damping mechanism may also be provided at the base 15.

What is claimed is:

1. A microscope system comprising:
   a driving mechanism configured to drive a movable part to which a specimen or an optical component is fixed and to stop the movable part at a certain position; and
   a vibration damping mechanism configured to dampen vibrations generated when stopping the movable part with the driving mechanism;
   wherein the vibration damping mechanism includes an inertial member having a prescribed mass and a viscoelastic member sandwiched between the inertial member and the movable part,
   wherein dimensions in a plurality of directions of the viscoelastic member are set based on resonance frequencies of vibrations generated in multiple directions when stopping the movable part, and
   wherein the vibrations generated in multiple directions are dampened by displacement of the inertial member in all vibration directions.

2. A microscope system according to claim 1, further comprising:
   a base member,
   wherein the driving mechanism drives the movable part relative to the base member, and
   wherein another vibration damping mechanism is provided in the base member.

3. A microscope system according to claim 1, wherein:
   the movable part comprises a stage on which the specimen is mounted; and the vibration damping mechanism is disposed at substantially a center of a bottom face of the stage and dampens vibrations in a moving direction of the stage and vibrations in a direction orthogonal to the moving direction of the stage.

4. A microscope system according to claim 1, wherein:
the movable part comprises a circular-plate-shaped filter turret in which a plurality of filters that modulate light are mounted, and
the vibration damping mechanism is disposed on an outer circumferential surface of the filter turret and dampens vibrations in a rotational direction of the filter turret and vibrations in a thickness direction of the filter turret.

5. A microscope system according to claim 1, wherein:
the movable part comprises a slider supporting at least one of a lens, a prism, and a mirror so as to be movable in a straight line, and
the vibration damping mechanism is disposed on a side face of the slider and dampens vibrations in a moving direction of the slider and vibrations in a direction orthogonal to the moving direction of the slider.

6. A microscope system according to claim 1, wherein:
the movable part comprises a slider supporting an objective lens so as to be movable in a straight line in an optical-axis direction, and
the vibration damping mechanism dampens vibrations in a moving direction of the slider and vibrations in a direction orthogonal to the moving direction of the slider.

7. A microscope system according to claim 1, wherein the inertial member is configured so that a center of mass thereof can be moved relative to the viscoelastic member.

* * * * *